(12) United States Patent
Yin et al.

(10) Patent No.: US 9,937,556 B2
(45) Date of Patent: Apr. 10, 2018

(54) TEMPLATED SYNTHESIS OF METAL NANORODS IN SILICA NANOTUBES

(71) Applicant: The Regents of the University of California, Oakland, CA (US)

(72) Inventors: Yadong Yin, Riverside, CA (US); Chuanbo Gao, Shaanxi Province (CN)

(73) Assignee: The Regents of the University of California, Oakland, CA (US)

( * ) Notice: Subject to any disclaimer, the term of this patent is extended or adjusted under 35 U.S.C. 154(b) by 613 days.

(21) Appl. No.: 14/358,127

(22) PCT Filed: Nov. 15, 2012

(86) PCT No.: PCT/US2012/065331
§ 371 (c)(1),
(2) Date: May 14, 2014

(87) PCT Pub. No.: WO2013/074822
PCT Pub. Date: May 23, 2013

(65) Prior Publication Data
US 2014/0329089 A1 Nov. 6, 2014

Related U.S. Application Data

(60) Provisional application No. 61/560,268, filed on Nov. 15, 2011.

(51) Int. Cl.
*B22F 1/00* (2006.01)
*B22F 9/18* (2006.01)
(Continued)

(52) U.S. Cl.
CPC ............ *B22F 1/004* (2013.01); *B22F 1/0025* (2013.01); *B22F 1/0062* (2013.01); *B22F 1/02* (2013.01);
(Continued)

(58) Field of Classification Search
CPC ...... B22F 1/0025; B22F 1/004; B22F 1/0062; B22F 1/02; B22F 9/18; B22F 9/24;
(Continued)

(56) References Cited

U.S. PATENT DOCUMENTS 5,409,683 A * 4/1995 Tillotson .............. B01J 13/0091
423/338
7,338,590 B1 * 3/2008 Shelnutt ................ B01J 31/003
205/628

(Continued)

FOREIGN PATENT DOCUMENTS

RU 2364472 C2 8/2009

OTHER PUBLICATIONS

Yongxing Hu, Qiao Zhang, James Goebl, Tierui Zhang and Yadong Yin Control over the permeation of silica nanoshells by surface-protected etching with water Phys. Chem. Chem. Phys., 2010, 12, 11836-11842.*

(Continued)

*Primary Examiner* — Jenny Wu
(74) *Attorney, Agent, or Firm* — Berliner & Associates

(57) ABSTRACT

A method of preparing a metal nanorod. The method includes seeding a metal nanoparticle within the lumen of a nanotube, and growing a metal nanorod from the seeded metal nanoparticle to form a metal nanorod-nanotube composite. In some cases, the nanotube includes metal binding ligands attached to the inner surface. Growing of the metal nanorod includes incubating the seeded nanotube in a solution that includes: a metal source for the metal in the metal nanorod, the metal source including an ion of the metal; a coordinating ligand that forms a stable complex with the metal ion; a reducing agent for reducing the metal ion, and (Continued)

a capping agent that stabilizes atomic monomers of the metal. Compositions derived from the method are also provided.

16 Claims, 7 Drawing Sheets

(51) Int. Cl.
*B82Y 30/00* (2011.01)
*C01B 33/18* (2006.01)
*B22F 1/02* (2006.01)
*B22F 9/24* (2006.01)
*B82Y 40/00* (2011.01)

(52) U.S. Cl.
CPC ............... *B22F 9/18* (2013.01); *B22F 9/24* (2013.01); *B82Y 30/00* (2013.01); *C01B 33/18* (2013.01); *B82Y 40/00* (2013.01); *Y10S 977/762* (2013.01); *Y10S 977/773* (2013.01); *Y10S 977/902* (2013.01); *Y10T 428/296* (2015.01); *Y10T 428/2993* (2015.01)

(58) Field of Classification Search
CPC ......... B82Y 30/00; B82Y 40/00; C01B 33/18; Y10S 977/762; Y10S 977/773; Y10S 977/902; Y10T 428/296; Y10T 428/2993
See application file for complete search history.

(56) References Cited

U.S. PATENT DOCUMENTS

| | | | |
|---|---|---|---|
| 2002/0179564 A1 | 12/2002 | Geobegan et al. | |
| 2004/0262636 A1* | 12/2004 | Yang | B82Y 10/00 257/200 |
| 2009/0060815 A1* | 3/2009 | Wong | B82Y 30/00 423/324 |
| 2010/0060109 A1* | 3/2010 | Russell | H01L 41/193 310/363 |
| 2010/0137157 A1 | 6/2010 | Shaw et al. | |
| 2013/0059074 A1* | 3/2013 | Xu | B22F 1/02 427/213 |
| 2014/0234157 A1* | 8/2014 | Chen | H01B 1/02 420/507 |

OTHER PUBLICATIONS

Chia-Chun Chen, Yao-Chung Liu, Chia-Hsuan Wu, Chun-Chia Yeh, Ming-Tsan Su,and Yi-Chun Wu Preparation of Fluorescent Silica Nanotubes and Their Application in Gene Delivery Advanced Material 2005, vol. 17 No. 4.*
Xiong, Y.; Cai, H.; Yin, Y.; Xia, Y. Chem. Phys. Lett. 2007, 440, 273.
Xiong, Y.; Cai, H.; Wiley, B. J.; Wang, J.; Kim, M. J.; Xia, Y. J. A. Lim, B.; Jiang, M.; Tao, J.; Camargo P. H. C.; Zhu, Y.; Xia, Y. Adv. Funct. Mater, 2009. 19, 189.
Chen, Y.-H.; Hung, H.-H.; Huang, M. H. J. Am. Chem. Soc. 2009, 131, 9114.
Millstone, J. E.; Wei, W.; Jones, M. R.; Yoo, H.; Mirkin, C. A. Nano Lett. 2008, 8, 2526.
Kyotani, T.; Tsai, L.-f.; Tomita, A. Chem. Commun. 1997, 701.
van der Zande, B. M. I.; Böhmer, M. R.; Fokkink, L. G. J.; Schönenberger, C. J. Phys. Chem. B 1997, 101, 852.
Cepak, V. M.; Martin, C. R. J. Phys. Chem. B 1998, 102, 9985.
Martin, B. R.; Dermody, D. J.; Reiss, B. D.; Fang, M.; Lyon, L. A.; Natan, M. J.; Mallouk, T. E. Adv. Mater. 1999, 11, 1021.
van der Zande, B. M. I.; Böhmer, M. R.; Fokkink, L. G. J.; Schönenberger, C. Langmuir 1999, 16, 451.
Gao, C.; Lu, Z.; Yin, Y. Langmuir 2011, 27, 12201.
Yuan, C.; Luo, W.; Zhong, L.; Deng, H.; Liu, J.; Xu, Y.; Dai, L. Angew. Chem, Int. Ed. 2011, 50, 3515.
Liu, B.; Zhang, W.; Feng, H.; Yang, X. Chem. Commun. 2011, DOI: 10.1039/C1CC13717D.
Hu, Y.; Zhang, Q.; Goebl, J.; Zhong, T.; Yin, Y. Phys. Chem. Chem. Phys. 2010, 11836.
Yin, Y., Alivisatos, A. P. Nature 2005, 437, 664.
Huang, X.; Neretina, S.; El-Sayed, M. A. Adv. Mater. 2009, 21, 4880.

* cited by examiner

TEMPLATED SYNTHESIS OF METAL NANORODS IN SILICA NANOTUBES

STATEMENT REGARDING FEDERALLY SPONSORED RESEARCH OR DEVELOPEMENT

This invention was made with Government support under Grant No. DMR0956081 awarded by the National Science Foundation, and Grant No. DE-SC0002247 awarded by the Department of Energy. The Government has certain rights in this invention.

BACKGROUND

Field of the Invention

The invention relates to methods and compositions for nanorods.

Related Art

Metal nanorods have received widespread interest due to their unique one-dimensional structure, their consequent unusual optical, electronic and catalytic properties, and their potential use in chemical sensing, cellular imaging and therapeutics. Specifically, noble metal Au (Jana, 2001; Nikoobakht, 2003; Gole, 2004; Sau, 2004; Kou, 2007), Ag (Zhang, 2011), Pt (Krishnaswamy, 2006; Peng, 2009) and Pd (Xiong, 2007a; Xiong, 2007b; Lim, 2009; Chen, 2009) nanorods have garnered great interest, among which Au nanorods have been most extensively studied due to their plasmonic activity. Most conventional syntheses rely on solution-phase reactions, e.g., seed-mediated growth for the synthesis of Au nanorods (Jana, 2001; Nikoobakht, 2003; Gole, 2004; Sau, 2004; Kou, 2007). The yield of nanorods relative to byproducts such as spheres and the sensitivity of the reaction to various parameters (and thus the reproducibility) (Millstone, 2008) have been major concerns in many circumstances.

Templating methods have also been pursued to synthesize metal nanorods by employing porous alumina membranes and polycarbonate filtration membranes as hard templates (Kyotani, 1997; van der Zande, 1997; Cepak, 1998; Martin, 1999; van der Zande, 1999; Kyotani, 1997; van der Zande, 1997; Cepak, 1998; Martin, 1999; van der Zande, 1999). Typical limitations of such templating synthesis include the difficulty in controlling both the width and length of the products, low yield because only a monolayer of metal nanorods could be prepared in a membrane template, and the high cost associated with these templates. In general, a practically useful templating method for nanostructure synthesis should meet the following requirements: (1) the convenient availability of well-defined templates in large quantity at low cost; (2) the precise placement of seeds inside the templates; (3) a well-controlled seeded growth process; and (4) a reliable process to selectively remove the templates.

SUMMARY

In one aspect, a method of preparing a metal nanorod is provided. The method includes seeding a metal nanoparticle within the lumen of a silica nanotube, and growing a metal nanorod from the seeded metal nanoparticle to form a metal nanorod-silica nanotube composite.

In the method, the silica nanotube can be removed from the metal nanorod-silica nanotube composite to obtain a nanorod preparation.

In another aspect, various compositions are provided. The compositions include products prepared by embodiments of the method.

In a further aspect, a solution for growing a metal nanostructure is provided. The solution includes: a metal source for a metal in the metal nanostructure, the metal source including an ion of the metal; a coordinating ligand that forms a stable complex with the metal ion; a reducing agent for reducing the metal ion; and a capping agent that stabilizes atomic monomers of the metal.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
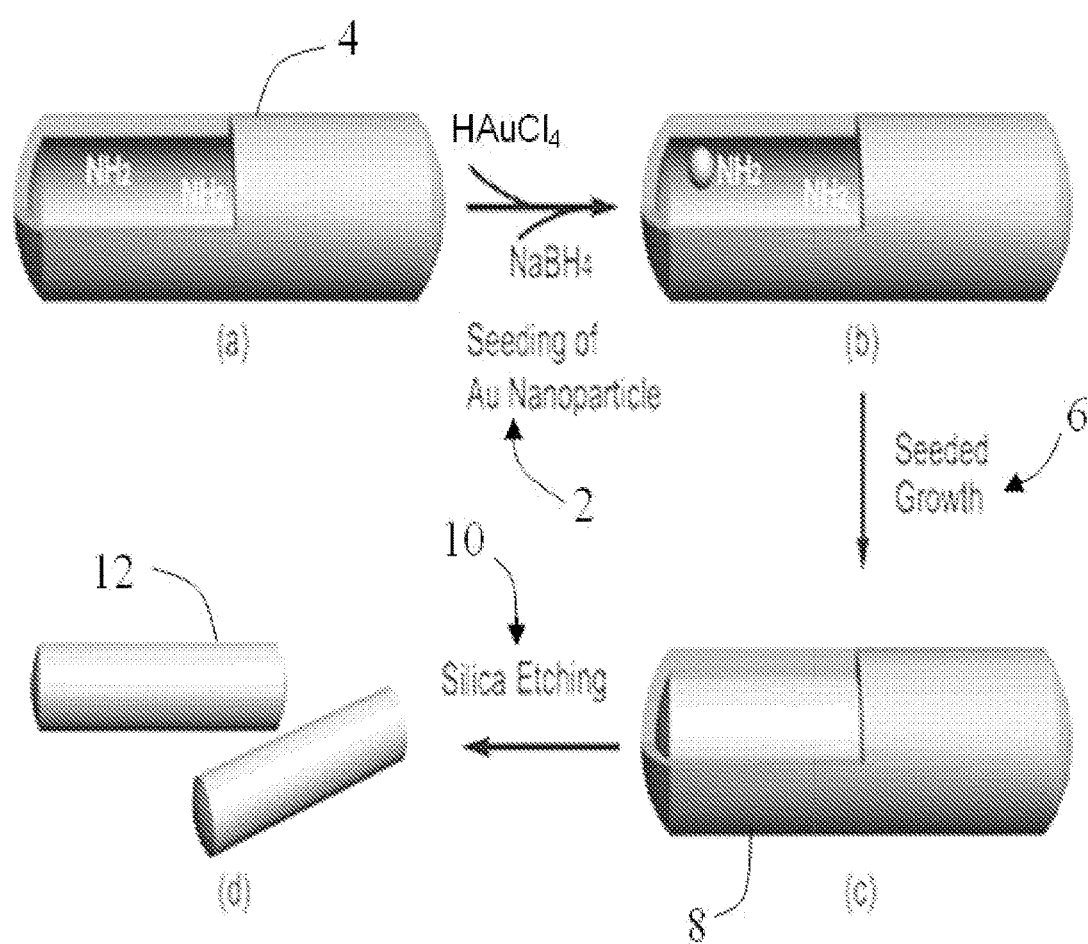
FIG. 1 is a schematic drawing describing a general templating approach to the synthesis of metal nanorods. (a) Silica nanotube with amino groups functionalized selectively on the inner surface; (b) Au seed@silica yolk/shell structure; (c) metal nanorod@silica core/shell structure obtained by seeded growth; (d) metal nanorods after etching of silica shells.

This application claims the benefit of Provisional Patent Application No. 61/560,268, filed on Nov. 15, 2011, which is incorporated by reference herein in its entirety.

A general method for the synthesis of metal nanorods, including Au, Ag, Pt and Pd, based on their seeded growth in nanotube templates, is provided. The nanotubes can comprise silica, alumina, titania, or any suitable polymer. Briefly, high-quality sihca nanotube templates functionalized by amino groups were firstly produced by coating uniform nickel-hydrazine rod-like nanocrystals with layers of organosilicate and pure silica through a sol-gel process, and then removing the nickel-hydrazine templates to yield tubular structures. The unique seeding process affords metal nanorods with high yield by positioning the Au seeds inside the silica nanotubes. The growth solutions combining a metal source, a reducing agent, a coordinating ligand and an additional capping ligand remain highly stable until the addition of seeds, allowing preferential growth on the seeds without homogeneous nucleation. The convenient availability of silica nanotube templates with different dimensions also affords metal nanorods with well-controlled aspect ratios. The wide applicability of this method to the synthesis of metal nanorods of various compositions, which were previously difficult to fabricate with high quality and in large quantity opens up great opportunities for discovering new properties and designing novel materials for diverse future applications in the fields of nanophotonics, catalysis sensing, imaging, and biomedicine.

In one aspect, a method of preparing a metal nanorod is provided. The method includes seeding a metal nanoparticle within the lumen of a nanotube, and growing a metal nanorod from the seeded metal nanoparticle to form a nanorod-nanotube composite. The nanotube can comprise silica, alumina, or titania, or any suitable polymer. In the method, the metal nanoparticle seed can comprise a metal such as, but not limited to, Au, Ag, Pt, Pd, Ir, Rh, Ru, Os, Ni, Co, Cu, Pb, Sn, Mn, Fe, or Zn, or a combination thereof, and the metal nanorod can comprise a metal such as, but not limited to, a noble metal including Ru, Rh, Os, Ir, Au, Ag, Pt or Pd, or other metal such as Mn, Fe, Co, Ni, Cu, Zn, Pb, or Sn, or a combination thereof. The metal nanoparticle seeds and the metal nanorods may also be the composites or alloys of several metals mentioned above.

In the method, the nanotube can comprise an inner surface that is functionalized with a metal-binding ligand. Examples of metal-binding groups in such ligands include, but are not limited to, amino groups, thiol groups, phosphate groups, sulfate groups, sulfonate groups, or carboxylate groups, or a combination thereof. In some embodiments, for example, a silica nanotube comprises an amino group-containing inner surface.

In the method, the seeding of the metal nanoparticle can comprise incubating the nanotube with a precursor of the metal nanoparticle. Examples of the precursor include, but are not limited to, $HAuCl_4$, $AgNO3$, $H_2PtCl_6$, $Na_2PdCl_4$, $AuCl_3$, $AuCl$, $AuI$, $KAuCl_4$, $AuCN$, $AuBr_3$, $AgClO_4$, $PtCl_2$, $PtCl_4$, $Pt(C_5H_7O_2)_2$, $PtBr_2$, $PtI_2$, $PdI_2$, $PdBr_2$, $PdCl_2$, $Pd(NO_3)_2$, $Pd(NO_3)_2.xH_2O$, $PdSO_4$, $Pd(CN)_2$.

In the method, the growing of the metal nanorod can comprise incubating the nanotube in a solution comprising: a metal source for a metal in the metal nanorod, the metal source comprising an ion of the metal; a coordinating ligand that forms a stable complex with the metal ion; a reducing agent for reducing the metal ion; and a capping agent that stabilizes atomic monomers of the metal. Examples of the metal source include, but are not limited to, $HAuCl_4$, $AgNO3$, $H_2PtCl_6$, $Na_2PdCl_4$, $AuCl_3$, $AuCl$, $AuI$, $KAuCl_4$, $AuCN$, $AuBr_3$, $AgClO_4$, $PtCl_2$, $PtCl_4$, $Pt(C_5H_7O_2)_2$, $PtBr_2$, $PtI_2$, $PdI_2$, $PdBr_2$, $PdCl_2$, $Pd(NO_3)_2$, $Pd(NO_3)_2.xH_2O$, $PdSO_4$, $Pd(CN)_2$. Examples of the coordinating ligand include, but are not limited to, $I^-$, $Cl^-$, $Br^-$, acetonitrile, $NO_2^-$, and molecules containing amino groups, thiol groups, phosphate groups, sulfate groups, sulfonate groups, carboxylate groups. Examples of the reducing agent include, but are not limited to, ascorbic acid, hydrazine, sodium borohydride. Examples of the capping agent include, but are not limited to, nonionic ligands such as polyvinylpyrrolidone, polyoxyethylene glycol alkyl ethers, polyoxypropylene glycol alkyl ethers, and many other ligand molecules containing amino groups, thiol groups, phosphate groups, sulfate groups, sulfonate groups, carboxylate groups. The term "atomic monomers" refers to the initial elemental metal species produced after the reduction of the metal salts. In general, the components of the solution are selected so that metal growth occurs generally, preferentially or exclusively on the seeded metal nanoparticle, compared to growth due to self-nucleation of the metal. Specific components are selected based in part on the metal to be included in the nanorod.

The method can further comprise the following: removing the nanotube from the nanorod-nanotube composite; etching or purifying, or both etching and purifying, the seeded nanotube after the seeding and prior to the growing; preparing the nanotube; preparing a rod-shaped nanocrystal for use in preparing the nanotube; or any combination thereof.

Thus, the method can comprise removing the nanotube from the nanorod-nanotube composite. Examples of the removing include, but are not limited to, procedures comprising etching of the composite in water, and etching of the composite by gaseous etchant. In particular embodiments, the nanotube is a silica nanotube.

The method can comprise etching or purifying, or both etching and purifying, the seeded nanotube after the seeding and prior to the growing. Etching can open the pores in the nanotube for better access of reaction components by diffusion, and can increase the diameter of the nanotube lumen. Examples of etching include, but are not limited to, procedures comprising incubating the seeded nanotube in NaOH of controlled concentration, incubating the seeded nanotube in water at temperatures higher than room temperature. Purification of the seeded nanotube, for example by centrifugation and washing, can remove self-nucleation reaction products that are produced outside the nanotube. In particular embodiments, the nanotube is a silica nanotube.

The method can comprise preparing a silica nanotube by coating a rod-shaped nanocrystal with a silica layer, then removing the rod-shaped nanocrystal to form the silica nanotube. In some embodiments, preparing the silica nanotube comprises preparing the silica nanotube by coating a rod-shaped nanocrystal with a silica layer, then removing the rod-shaped nanocrystal to form the silica nanotube. In the method, the coating can comprise sol-gel formation of the silica layer. In the method, the sol-gel formation can comprise hydrolyzing and condensing a silicon alkoxides onto the rod-shaped nanocrystal to form the silica layer, or hydrolyzing and condensing an amino-containing organosilane onto the nanocrystal to form the organosilicate layer, and then hydrolyzing and condensing a silicon alkoxide onto the organosilicate layer to form the silica layer. In some embodiments of the method, the organosilane can be, but is not limited to, 2-aminopropyltriethoxysilane, (3-aminopropyl)tris(trimethylsiloxy)silane, or trimethoxy[3-(methylamino)propyl]silane, and the silicon alkoxide can be, but is not limited to, tetraethyl orthosilicate, tetramethyl orthosilicate, tetrapropyl orthosilicate, or tetrabutyl orthosilicate.

The method can comprise preparing the rod-shaped nanocrystal by one-dimensional growth of materials at the nanometer scale. The method can comprise the one-dimensional growth of materials with anisotropic crystal structures, or the one-dimensional growth of materials under the guidance of other templates such as surfactant assemblies and catalyst particles. In some embodiments of the method, the rod-shaped nanocrystal can comprise a crystalline nanorod of a nickel-hydrazine complex grown by a precipitation reaction between nickel salt such as $NiCl_2$ and hydrazine hydrate in reverse micelles formed by water, a polyoxyethylene-type surfactant, and an organic solvent.

In some embodiments of the method, the rod-shaped nanocrystal and the nanotube can be about 20 nm to about 10 µm in length, and about 10 to about 100 nm in outside diameter; the seeded metal nanoparticle can be about 5 to about 50 nm in diameter; the metal nanorod can be about 20 nm to about 10 µm in length. In particular embodiments, the nanotube is a silica nanotube.

In another aspect, compositions are provided. The compositions include various products derived from the procedures described herein. In some embodiments, a composition comprising a nanotube, or a plurality of nanotubes, having an amino group-containing inner surface is provided. In some embodiments, a composition comprising a metal nanoparticle in a nanotube, or a plurality of such nanotubes, is provided. In some embodiments, a composition comprising a metal nanorod in a nanotube, or a plurality of such nanotubes, is provided. In particular embodiments, the nanotube(s) is a silica nanotube(s).

Also provided is a solution for growing a metal nanostructure. The solution is derived from the procedures described herein. The solution comprises: a metal source for a metal in the metal nanostructure, the metal source including an ion of the metal; a coordinating ligand that forms a stable complex with the metal ion; a reducing agent for reducing the metal ion; and a capping agent that stabilizes atomic monomers of the metal.

The term "nano" in "nanotube," "nanocrystal," "nanorod," "nanoparticle" or other nanostructure indicates a structure having at least one dimension in the range of 0.1-100 nm.

The present invention may be better understood by referring to the accompanying examples, which are intended for illustration purposes only and should not in any sense be construed as limiting the scope of the invention.

EXAMPLE 1

A robust templating approach to the synthesis of metal nanorods, including Au, Ag, Pt and Pd in composition, with well-controlled dimensions and high yield is presented. In some embodiments, the method includes the employment of silica nanotube templates with tunable dimensions for which a large-scale synthesis was developed recently in our laboratory (Gao, 2011). Briefly, these high-quality templates were produced by coating uniform nickel-hydrazine rod-like (or rod-shaped) nanocrystals with a layer of silica through a sol-gel process, and then selectively removing the nickel-hydrazine templates to yield tubular structures.

Subsequent templated growth of metal nanorods, as outlined in FIG. 1, includes: (1) the seeding 2 of Au nanoparticles in the cavity of silica nanotubes 4, (2) the confined growth 6 of metal initiated from the Au seeds, forming a metal nanorod@silica core/shell structure 8 (or nanorod-silica nanotube composite), and (3) the etching 10 of the silica shell producing metal nanorods 12.

In addition to the synthesis of well-defined templates, introducing Au seeds preferentially or exclusively into the cavity of these templates is another step as it ensures that subsequent metal growth occurs in the confined space rather than outside as a result of self-nucleation. There are only a few reports on the seeding of Au nanoparticles in a preexisting nanostructure, which were achieved by infiltration of $HAuCl_4$ solution into the nanostructure followed by reduction by $NaBH_4$ (.{Yuan, 2011; Liu, 2011). In the synthesis reported herein, in order to produce Au seeds preferentially within the inner cavity, the original silica nanotube synthesis was modified by introducing a layer of 3-aminopropyltriethoxysilane (APS) to the surface of the nickel-hydrazine nanorods before the deposition of a silica layer through the hydrolysis of tetraethyl orthosilicate (TEOS). As is well known, Au species, including the anionic $AuCl_4^-$ and metallic Au, have a high affinity to amino groups due to electrostatic and/or coordinate interactions. The selective modification of the inner surface of the silica nanotubes with amino groups allows the retention of the Au species inside the templates during the chemical adsorption of $HAuCl_4$, that can result in Au seeds preferentially or exclusively positioned inside the silica nanotubes after reduction.

Figure 2:
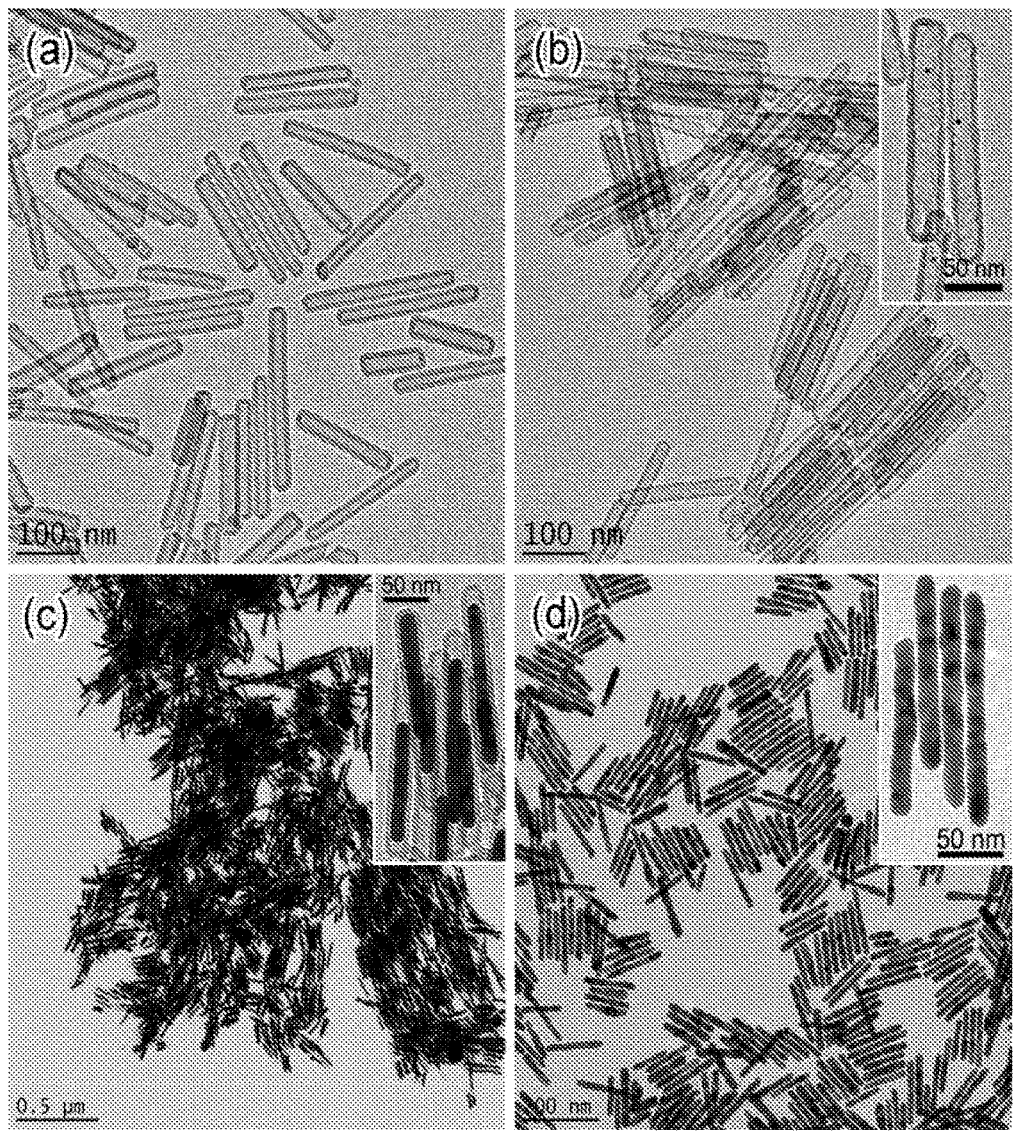
FIG. 2 are TEM images of (a) silica nanotubes with inner cavity functionalized with amino groups; (b) Au seed@silica nanotubes; (c) Au nanorod@silica nanotubes after seeded growth; (d) Au nanorods after removal of silica templates.

FIG. 2a shows the TEM image of a typical sample of silica nanotubes, synthesized by using polyoxyethylene(10) cetyl ether (Brij C10) as the surfactant. They possess an average length of 200 nm and a cavity width of 12 nm, which are determined independently by the hydrazine/nickel ratio and the intrinsic size of the surfactant micelles (Gao, 2011). Modification of the inner surface with amino groups results in no significant change to the tubular morphology of the silica templates. After seeding, Au nanoparticles ~4 nm in size are formed inside each silica nanotube, as shown in FIG. 2b. No obvious nucleation outside the silica nanotubes has been observed. The UV-Vis spectrum of the material (Example 2) shows an absorption band at ~512 nm, characteristic of small-sized Au nanospheres. To enhance the mass transfer through the silica shell in the following seeded growth of metal nanorods, the Au seed@silica sample was etched with water at 70° C. for 1 h, increasing the pore size in the silica shell (Hu, 2010), and in the meantime, the inner diameter of the cavity was enlarged to ~15 nm.

It is desirable in the seeded growth step to maintain a low reaction rate and minimize self-nucleation events. Taking Au for example, ascorbic acid was used as a weaker reducing agent to replace $NaBH_4$ for the reduction of Au salt. However, on direct mixing of the ascorbic acid with $AuCl_4^-$, the solution still quickly turned red, suggesting self-nucleation due to the high reduction potential of $AuCl_4^-$ (+0.93 V vs SHE). To further slow down the self-nucleation, a coordinating ligand, KI, was introduced, which reacts with $AuCl_4^-$ forming a stable complex $AuI_4^-$ with a decreased reduction potential (+0.56 V vs SHE) due to the strong Au—I affinity. An additional capping ligand, typically polyvinylpyrrolidone (PVP), was also added to the growth solution to stabilize the atomic monomer species and further delay the self-nucleation (Yin, 2005). PVP also has the function of preventing the final products from agglomeration. The as-prepared growth solution, which combines $HAuCl_4$, PVP, KI and ascorbic acid, remained stable at room temperature for longer than 2 h without obvious self-nucleation, as evidenced by UV-Vis spectrophotometry measurements. However, immediately after the Au seed@silica was injected into the growth solution, growth of Au on the existing seeds occurred as evidenced by the color change of the mixture.

The silica nanotube acts as a limiting factor to restrain the growth of metal in one dimension, leading to the formation of nanorods. The seeded growth stops theoretically when the nanorods reach the end of the templates. FIG. 2c shows a TEM image of the Au nanorod@silica nanostructures obtained by seeded growth. The final Au nanorods fill the inner space of the silica nanotubes, taking their shape and size. Interestingly, most silica nanotubes are not completely filled by Au nanorods, probably because at the end of the reaction, the concentration of the Au precursors/monomers decreases dramatically, and their limited diffusion to the drastically contracted free space of the silica nanotube is not able to support extensive continued growth. The low-magnification TEM image in FIG. 2c indicates the high yield of the Au nanorods, as no obvious presence of free Au nanospheres has been observed, which could be attributed to the exclusive seeding of the Au nanoparticles inside the silica nanotubes and the high stability of the growth solution against self-nucleation.

Well-defined metal nanorods could be finally obtained after removing the silica shell by NaOH etching. The particular sample of Au nanorods shown in FIG. 2d has an average dimension of 17 nm×150 nm, which is consistent with the cavity size of the silica nanotubes with a slight deviation. The nanorods are uniform in size with high yield, proving the competence of this method in synthesizing high-quality samples.

Figure 3:
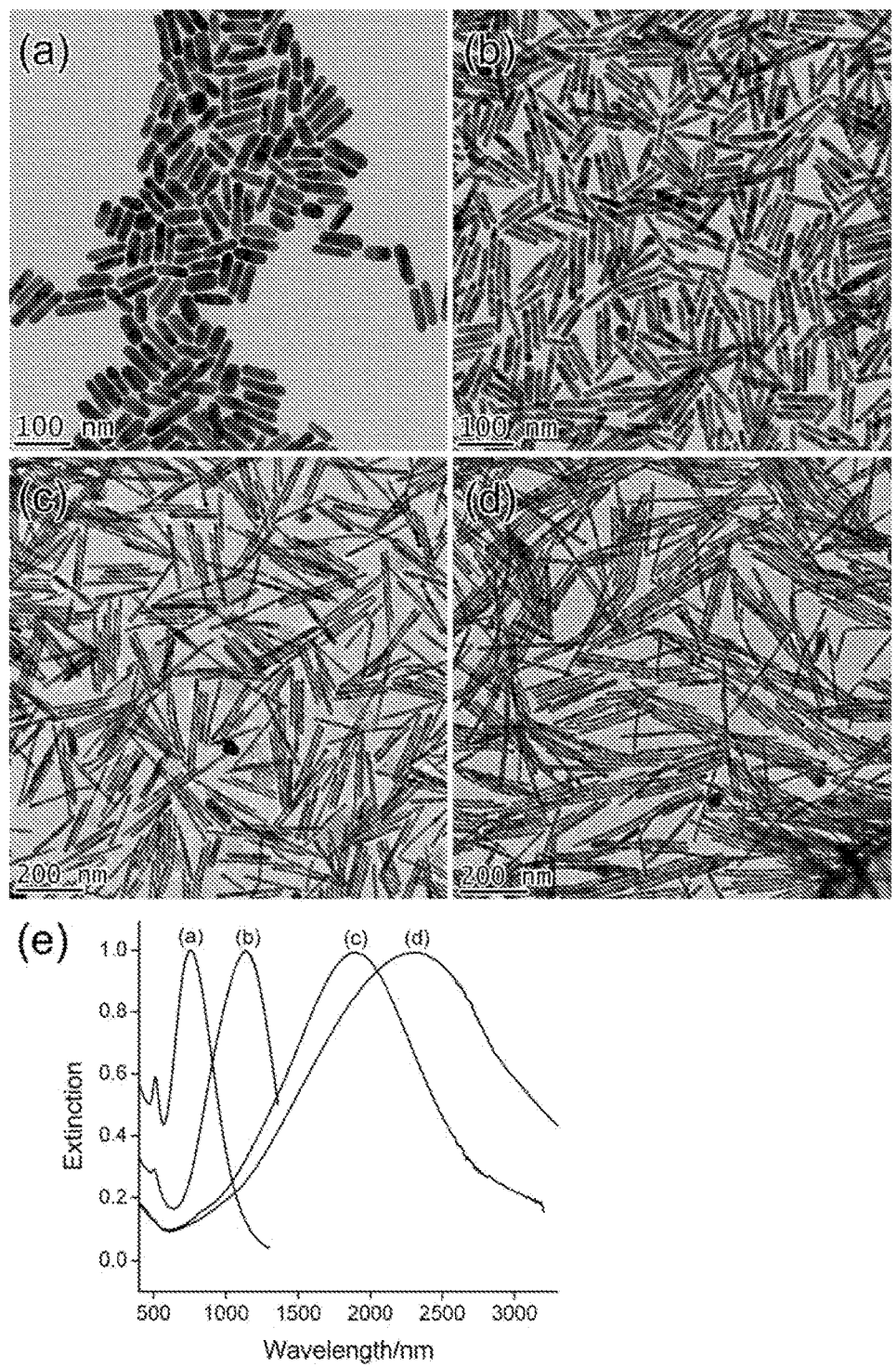
FIG. 3 (*a-d*) are TEM images and (e) UV-Vis-NIR spectra of Au nanorods prepared by using silica nanotubes with different aspect ratios as templates. Spectra for samples (a) and (b) were taken from a water solution of the samples, and for (c) and (d) were taken from samples deposited on glass slides.

This method is versatile in affording metal nanorods with different aspect ratios, which can be conveniently achieved by controlling the aspect ratio of the original silica nanotubes through tuning the hydrazine/nickel ratio during the original template synthesis (Gao, 2011). A series of Au nanorods prepared by this method is presented in FIG. 3, showing both the TEM images and the UV-Vis-near IR (NIR) spectra. With the average aspect ratio increasing from 3.5 to 5.7, 14.8 and 21, the longitudinal plasmonic band red-shifts significantly from 755 nm to 1132 nm, 1885 nm and 2320 nm, which are close to the values predicted by theoretical calculations ($\lambda_{max}$=95 R+420 nm, R: aspect ratio) (Huang, 2009). The transverse plasmonic band, on the other hand, blue-shifts from 512 nm (sample a) to ~504 nm (samples b-d) (Supporting Information), with the intensity becoming drastically weaker compared with that of the longitudinal bands. The absence of the plasmonic band at 530 nm suggests the nonexistence of Au nanospheres and therefore the high yield of nanorods.

Figure 4:
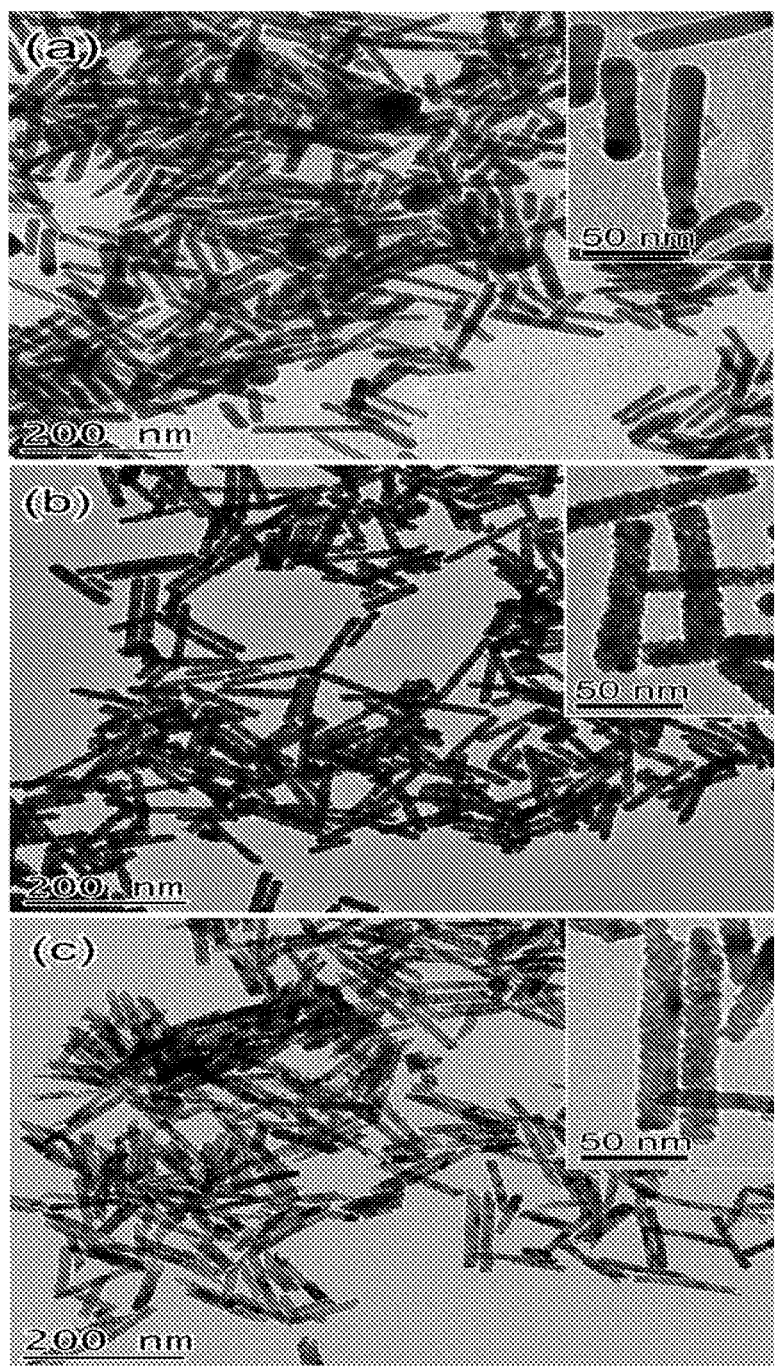
FIG. 4 are TEM images of (a) Ag, (b) Pt and (c) Pd nanorods prepared by seeded growth in silica nanotubes.

The hard-templating method to synthesize metal nanorods is not restricted to Au, but can be readily extended to many other metals, including Ag, Pt and Pd. Typical samples of Ag, Pt and Pd nanorods prepared by this method are shown in the TEM images in FIG. 4.

Ag nanorods are difficult to synthesize by conventional methods, with only a few reports documented in the literature (Zhang, 2011), but can be easily synthesized using the silica nanotube templates. In preparing the growth solution for Ag nanorods, $AgNO_3$ was used as the metal source, ascorbic acid as the reducing agent, acetonitrile as the coordinating ligand, and sodium citrate as the additional capping ligand. The nitrile group on acetonitrile can effectively coordinate to a $Ag^+$ ion, lowering its reduction potential and thus preventing self-nucleation. The seeded growth of Ag nanorods was initiated by injecting the Au seed@silica into the growth solution. A significant color change was observed, from colorless to yellow, red, blue, gray and eventually green, indicating a change in the aspect ratio accompanying the growth of the Ag nanorods. The silica shell was removed by etching the sample with NaOH, with a small amount of diethylamine added to the solution to enhance the stability of the Ag nanorods against base etching. Pure Ag nanorods have been obtained by this method, as shown in FIG. 4a.

Likewise, to synthesize Pt and Pd nanorods, growth solutions were first prepared, to which the Au seed@silica was injected to trigger seeded growth in the confined space. The growth solution for Pt was prepared with $H_2PtCl_6$ as the metal source, hydrazine hydrate as the reducing agent, $NaNO_2$ as the coordinating ligand, and PVP as the additional capping ligand. Similarly, the growth solution for Pd contained $Na_2PdCl_4$ as the metal source, ascorbic acid as the reducing agent and PVP as the additional capping ligand. TEM images of the Pt and Pd nanorods after etching of silica are displayed in FIGS. 4b and 4c, respectively, demonstrating the high yield of the synthesis. The aqueous solutions of the nanorods are black in color, without discernible optical features. By comparing the high-magnification images in the insets, the Pt and Pd nanorods appear grainier than the Au and Ag nanorods, although all are polycrystalline in nature. The cause of the different crystallinity is unknown.

The seeded growth of metal nanorods in the silica nanotubes has been monitored by TEM (supporting information) and in-situ UV-Vis-NIR spectrophotometry studies, taking Au and Ag as typical models. Growth intermediates of Au nanorods in silica nanotubes were collected at different growth stages. Prior to quick centrifugation, at each stage additional PVP was added to the growth solution to stabilize the monomer species and effectively stop the growth. The Au seeds in silica nanotubes initially grow isotropically into larger nanospheres. After reaching the diameter of the silica nanotubes, they begin growing one-dimensionally as a result of the confinement of the silica shell, forming anisotropic nanorods which continue growing in the longitudinal direction of the silica nanotube until reaching or near to the ends of the silica nanotubes.

Figure 5:
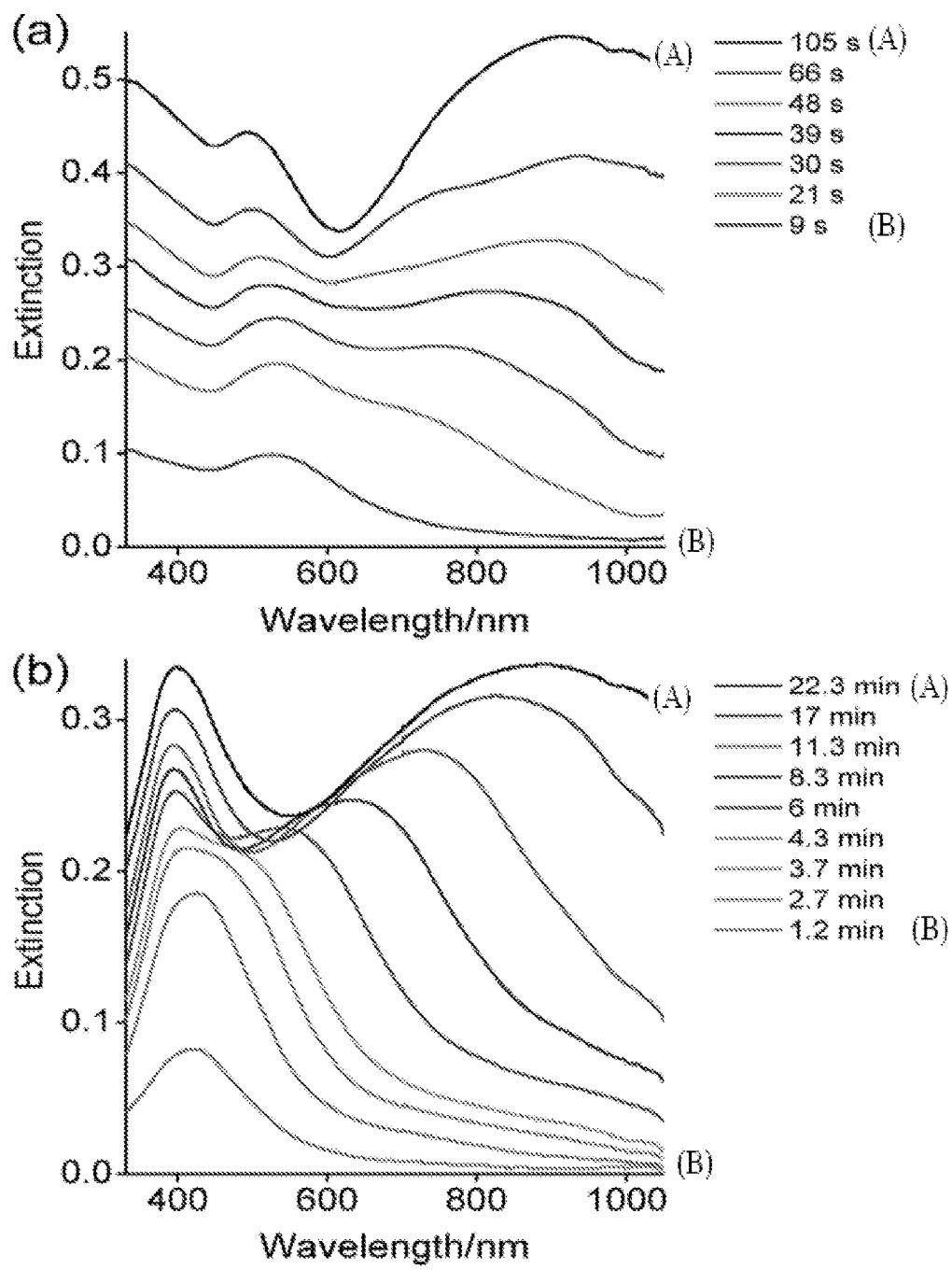
FIG. 5 is shows the evolution of plasmonic peaks during the seeded growth of (a) Au and (b) Ag nanorods in the silica nanotubes, as monitored by in-situ UV-Vis-NIR spectrophotometry.
Figure 6:
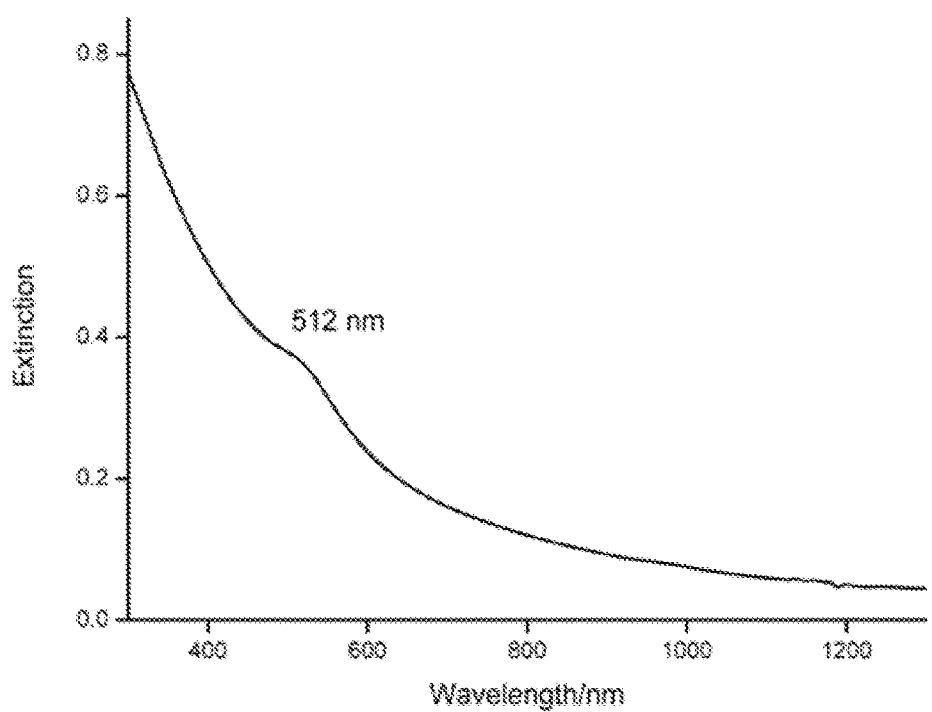
FIG. 6 is a UV-Vis-NIR spectrum of an aqueous solution of Au seed@silica nanotubes.
Figure 7:
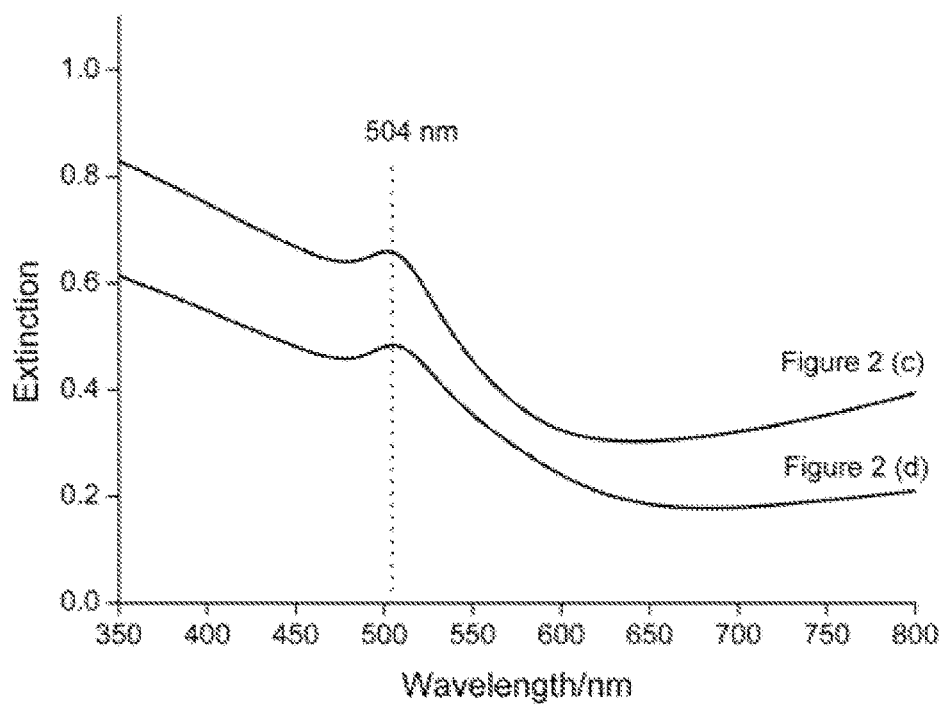
FIG. 7 are UV-Vis spectra of the water solutions of Au nanorods (in cuvette), showing the transverse plasmon bands. The two spectra correspond to the samples shown in FIGS. 2*c* and 2*d* which were deposited on glass slides for spectroscopic studies.
Figure 8:
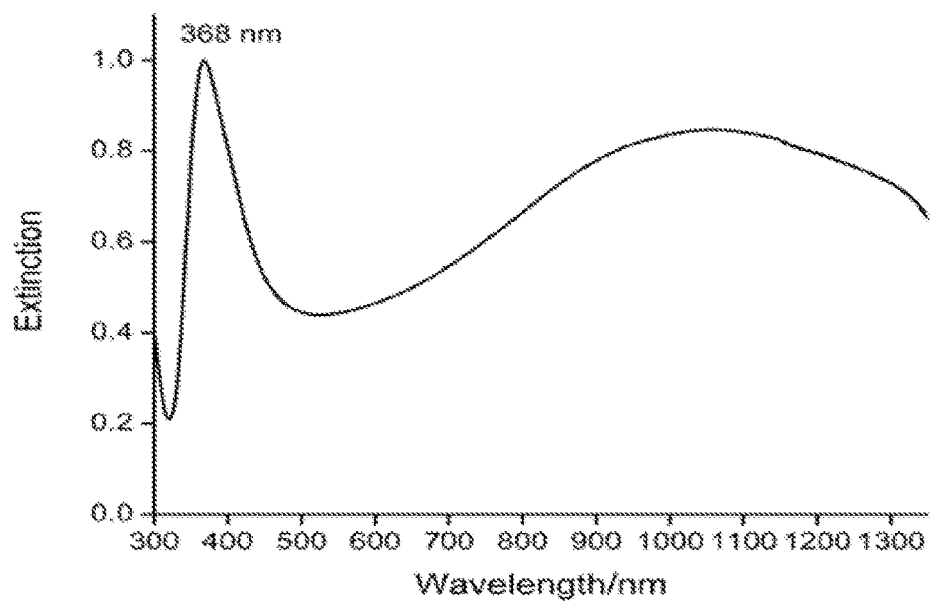
FIG. 8 is a UV-Vis-NIR spectrum of Ag nanorods after silica etching (TEM shown in FIG. 4*a*).
Figure 9:
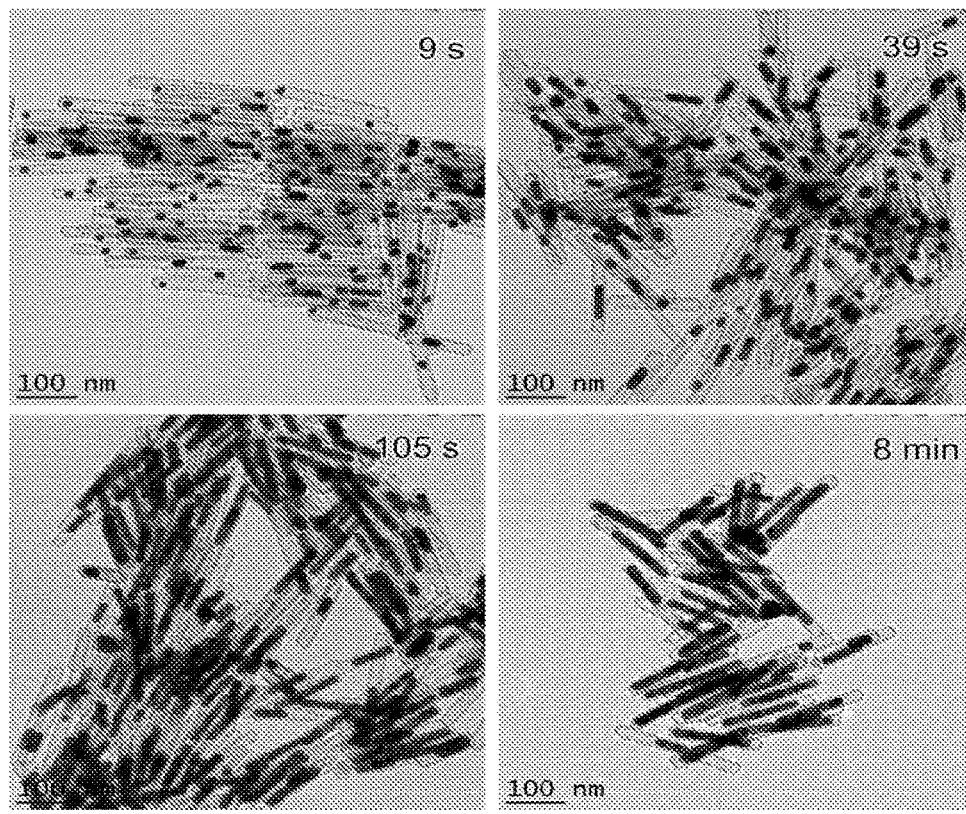
FIG. 9 shows growth intermediates of Au nanorods in the silica nanotubes monitored by TEM observation.

The growth of Au nanorods in the silica nanotubes is accompanied by a change in the optical property, as shown in FIG. 5a. Shortly after the growth started, a single absorption peak at ~530 nm was observed, indicative of the formation of Au nanospheres. As the growth went on, a longitudinal plasmon band of Au at a longer wavelength appeared, suggesting the formation of Au nanorods. The longitudinal band red-shifted thereafter, accompanied by a blue-shift of the transverse band, consistent with an increase in the aspect ratio of the nanorods resulting from an elongation of the Au nanorods. The extinction increases throughout the process, due to an increase in the absolute amount of elemental Au. These results match very well with the TEM observations and confirm the growth process of Au nanorods in silica nanotubes. Similar evolution of the plasmon resonance peaks was also observed for Ag nanorods, as shown in FIG. 5b, confirming the same seeded growth mechanism. Apparently, harvesting the samples at different reaction stages followed by template removal represents another effective method to control the aspect ratio of metal nanorods.

In summary, a general method is described to synthesize noble metal nanorods in silica nanotubes, which includes Au seeding in the cavity of the silica nanotubes, seeded growth of metal nanorods in the confined space, and removal of the silica templates by chemical etching. This robust templating process is highly scalable as the silica nanotubular templates can be obtained in large quantities at low costs. The unique seeding process affords metal nanorods with high yield by positioning the Au seeds inside the silica nanotubes. The growth solutions combining a metal source, a reducing agent, a coordinating ligand and an additional capping ligand remain highly stable until the addition of seeds, allowing preferential growth on the seeds without homogeneous nucleation. The convenient availability of silica nanotube templates with different dimensions also affords metal nanorods with well-controlled aspect ratios. This provides a widely applicable method for the synthesis of noble metal nanorods of various compositions, which were previously difficult to fabricate with high quality and in large quantity.

EXAMPLE 2

Experimental Details
Chemicals

Polyvinylpyrrolidone (PVP, Mw 3500, K12), hydrogen tetrachloroaurate (III) trihydrate ($HAuCl_4 \cdot 3H_2O$), sodium tetrachloropalladate (II) ($Na_2PdCl_4$, 36.4% Pd), potassium iodide (KI), sodium nitrite ($NaNO_2$), hydrazine hydrate (100%, hydrazine 64%), 3-aminopropyltriethxoysilane (APS) and tetraethyl orthosilicate (TEOS) were purchased from Acros. Polyoxyethylene(10) cetyl ether (Brij C10), sodium citrate tribasic dihydrate (TSC, 99%), L-ascorbic acid, silver nitrate ($AgNO_3$), chloroplatinic acid hexahydrate ($H_2PtCl_4 \cdot 6H_2O$), and sodium borohydride ($NaBH_4$, 99%) were purchased from Sigma-Aldrich. Nickel chloride hexahydrate ($NiCl_2 \cdot 6H_2O$), diethylamine, sodium hydroxide (NaOH), hydrochloric acid (HCl, 37.5%), acetonitrile, cyclohexane and isopropanol were purchased from Fisher Scientific. Thiol-PEG (Mw 1000) was purchased from Nanocs. All chemicals were used as received without further purification.

Synthesis of Silica Nanotubes with Amino Groups Functionalized on the Inner Surface In a typical synthesis, 8.5 g of Brij C10 was dissolved in 15 mL of cyclohexane and was kept at 50° C. Under stirring, 1.3 mL of $NiCl_2$ solution (0.8 M) was added and stirred until homogeneity. After that, 0.45 mL of hydrazine hydrate was added to form nickel-hydrazine complex nanorods. After 3 hours of reaction, 30 μL, of APS and 1 mL of diethylamine were added and the reaction system was stirred for 1.5 h, ensuring complete hydrolysis and condensation of APS on the surface of the newly formed nickel-hydrazine nanorods. Then, 3 mL of TEOS were added for silica coating, which was allowed to proceed for 3 hours. The nickel-hydrazine nanorod@silica core/shell structured material was collected by centrifugation, washed with isopropanol, and stored in 25 mL of isopropanol.

The length of the nickel-hydrazine nanorod@silica nanotubes can be tuned by changing the amount of the $NiCl_2$ solution in the synthesis. Meanwhile, the amounts of the APS and TEOS were changed proportionally in each synthesis.

The removal of the nickel-hydrazine nanorods from inside the silica shell was achieved by acid etching. Typically, 6 mL of the above solution was taken (for materials synthesized with different amounts of $NiCl_2$, this volume was compensated in inverse proportion to get the same amount of the final product), centrifuged, dispersed in 35 mL of HCl (1 M), and stirred for 1 h at room temperature. After etching, the solid was recovered by centrifugation, washed with water, and dispersed in 15 mL of ethanol containing 300 μL of ammonium hydroxide (28%) for the deprotonation of the aminopropyl groups. The solid was then washed with ethanol and stored in 15 mL of ethanol.

Seeding of Au Nanoparticles in the Cavity of the Silica Nanotubes

In a typical seeding experiment, 2 mL of the above ethanol solution containing silica nanotubes was taken, centrifuged, washed with water to pH neutral, and dispersed in 0.5 mL of water. Then, 30 μL, of $HAuCl_4$ (0.1 g/mL in water, 0.25 M) was added and stirred for 15 min. The solid was collected by centrifugation, washed with water three times, and redispersed in 1 mL of water, to which was added 0.5 mL of $NaBH_4$ solution (0.1 M, freshly prepared and iced). The solid dispersion turned red, forming Au seed@silica nanotube yolk/shell structures, and was then recovered by centrifugation and washed with HCl (0.01 M) and water to remove residual $NaBH_4$.

To favor the mass transfer during subsequent seeded growth, the Au seed@silica nanotube obtained was etched with 15 mL of water at 70° C. for 1 h for better porosity of the silica shell. The material was finally stored in 3 mL of water as a stock solution.

Seeded Growth of Au Nanorods in Silica Nanotubes

In a glass vial, under stirring, chemicals were added in the following order: 2 mL of water, 200 μL of PVP solution (Mw 3500, 5% in water), 200 μL of KI (0.2 M), 200 μL of ascorbic acid (0.1 M), and 30 μL of $HAuCl_4$ (0.1 g/mL, 0.25 M), forming a clear colorless solution (growth solution). Then, 75 μL of the Au seed@silica stock solution was injected into the growth solution, and the growth of Au nanorods started immediately, accompanied by a significant color change from colorless to red, blue, gray and reddish-yellow. After 10 min of reaction, the Au nanorod@silica material was collected by centrifugation and washed with water.

To investigate the growth intermediates of the Au nanorods, after a designated length of time, the growth reaction was slowed down by adding a solution of PVP (5%), and then the solid was quickly recovered by centrifugation and washed with water. The effect of PVP on slowing down the growth reaction can be confirmed by in-situ UV-Vis-NIR spectrometry.

Seeded Growth of Ag Nanorods in Silica Nanotubes

In a glass vial, under stirring, chemicals were added in the following order: 1 mL of water, 1 mL of TSC solution (0.1 M), 1 mL of acetonitrile, 200 μL of ascorbic acid (0.1 M), and 80 μL of $AgNO_3$ (0.1 M), forming a clear colorless solution (growth solution). Then, 80 μL of the Au seed@silica stock solution was injected into the growth solution, and the growth of Ag nanorods started immediately, accompanied by a significant color change from colorless to yellow, red, blue, gray and finally green. After 20 min of reaction, the Ag nanorod@silica material was collected by centrifugation and washed with water.

Seeded Growth of Pt Nanorods in Silica Nanotubes

In a glass vial, under stirring, chemicals were added in the following order: 2 mL of water, 200 μL of PVP solution (Mw 3500, 5% in water), 120 μl of $NaNO_2$ (1 M), 10 μL of hydrazine hydrate, and 80 μL of $H_2PtCl_6$ (0.1 M), forming a clear yellow solution. Then, 80 μL of the Au seed@silica stock solution was injected into the growth solution, and the growth of Pt nanorods started slowly, showing a color change to gray and black. After 30 min of reaction, the Pt nanorod@silica material was collected by centrifugation and washed with water.

Seeded Growth of Pd Nanorods in Silica Nanotubes

In a glass vial, under stirring, chemicals were added in the following order: 2 mL of water, 200 μL of PVP solution (Mw 3500, 5% in water), 200 μL of ascorbic acid (0.1 M), and 80 μL of $Na_2PdCl_4$ (0.1 M), forming a clear yellow solution. Then, 80 μL of the Au seed@silica stock solution was injected into the growth solution, and the growth of Pd nanorods started immediately, showing a color change to gray and black. After 30 min of reaction, the Pd nanorod@silica material was collected by centrifugation and washed with water.

Etching of Silica to Harvest Metal Nanorods

To obtain Au nanorods with high dispersity in water, thio-PEG was used for capping on the Au nanorods during the silica etching. Typically, one batch of the Au nanorod@silica was dispersed in 2.7 mL of water, to which were added 30 μL of thio-PEG (Mw 1000, 10 mg/mL) and 0.3 mL of NaOH (1 M). The dispersion was stirred at room temperature for 1 h. The Au nanorods were collected by centrifugation and washed with water.

When etching silica to obtain Ag nanorods, diethylamine was used to protect the nanorods from etching by NaOH and $O_2$. Typically, one batch of the Ag nanorod@silica was dispersed in 2.3 mL of water, to which were added 0.3 mL of PVP (Mw 3500, 5%), 0.15 mL of diethylamine and 0.3 mL of NaOH (1 M). The dispersion was stirred at room temperature for 1 h. The Ag nanorods were collected by centrifugation and washed with water.

To obtain Pt and Pd nanorods, one batch of the Pt/Pd nanorod@silica was dispersed in 2.4 mL of water, to which were added 0.3 mL of PVP (Mw 3500, 5%) and 0.3 mL of NaOH (1 M). The dispersion was stirred at room temperature for 1 h. The Pt/Pd nanorods were collected by centrifugation and washed with water.

Characterization

TEM images were taken with a Philips Tecnai 12 transmission electron microscope operating at 120 kV. Samples were drop cast on a carbon film supported copper grid and tested after drying in air or vacuum. UV-Vis-Near IR (NIR) spectra were measured with a Cary 500 UV-Vis-NIR spectrophotometer. The samples were tested in water when the longitudinal plasmon band was shorter than 1350 nm or on an aminopropyl functionalized glass slide when the longitudinal plasmon band was longer than 1350 nm, avoiding the significant water absorption band. The aminopropyl functionalized glass slides were obtained by treating glass cover slides with $HNO_3$ (2 M) at 80° C. for 2 h and then with a toluene solution of APS (50 µL in 25 mL of toluene) at 80° C. for 15 min. The in-situ UV-Vis-NIR spectra were taken with an Ocean Optics HR2000 CG-UV-NIR high resolution spectrometer, in order to monitor the real-time growth of the Au and Ag nanorods.

REFERENCES

The following publications are incorporated by reference herein in their entireties.

(1) Jana, N. R.; Gearheart, L.; Murphy, C. J. *Adv. Mater.* 2001, 13, 1389.
(2) Nikoobakht, B.; El-Sayed, M. A. *Chem. Mater.* 2003, 15, 1957.
(3) Gole, A.; Murphy, C. J. *Chem. Mater.* 2004, 16, 3633.
(4) Sau, T. K.; Murphy, C. J. *Langmuir* 2004, 20, 6414.
(5) Kou, X.; Zhang, S.; Tsung, C.-K.; Yang, Z.; Yeung, M. H.; Stucky, G. D.; Sun, L.; Wang, J.; Yan, C. *Chem. Eur. J.* 2007, 13, 2929.
(6) Zhang, J.; Langille, M. R.; Mirkin, C. A. *Nano Lett.* 2011, 11, 2495.
(7) Krishnaswamy, R.; Remita, H.; Impéror-Clerc, M.; Even, C.; Davidson, P.; Pansu, B. *Chemphyschem* 2006, 7, 1510.
(8) Peng, Z.; Yang, H. *Nano Today* 2009, 4, 143.
(9) a) Xiong, Y.; Cai, H.; Yin, Y.; Xia, Y. *Chem. Phys. Lett.* 2007, 440, 273.
(10) b) Xiong, Y.; Cai, H.; Wiley, B. J.; Wang, J.; Kim, M. J.; Xia, Y. *J. Am. Chem. Soc.* 2007, 129, 3665.
(11) Lim, B.; Jiang, M.; Tao, J.; Camargo, P. H. C.; Zhu, Y.; Xia, Y. *Adv. Funct. Mater.* 2009, 19, 189.
(12) Chen, Y.-H.; Hung, H.-H.; Huang, M. H. *J. Am. Chem. Soc.* 2009, 131, 9114.
(13) Millstone, J. E.; Wei, W.; Jones, M. R.; Yoo, H.; Mirkin, C. A. *Nano Lett.* 2008, 8, 2526.
(14) Kyotani, T.; Tsai, L.-f.; Tomita, A. *Chem. Commun.* 1997, 701.
(15) van der Zande, B. M. I.; Bohmer, M. R.; Fokkink, L. G. J.; Schonenberger, C. *J. Phys. Chem. B* 1997, 101, 852.
(16) Cepak, V. M.; Martin, C. R. *J. Phys. Chem. B* 1998, 102, 9985.
(17) Martin, B. R.; Dermody, D. J.; Reiss, B. D.; Fang, M.; Lyon, L. A.; Natan, M. J.; Mallouk, T. E. *Adv. Mater.* 1999, 11, 1021.
(18) van der Zande, B. M. I.; Böhmer, M. R.; Fokkink, L. G. J.; Schönenberger, C. *Langmuir* 1999, 16, 451.
(19) Gao, C.; Lu, Z.; Yin, Y. *Langmuir* 2011, 27, 12201.
(20) Yuan, C.; Luo, W.; Zhong, L.; Deng, H.; Liu, J.; Xu, Y.; Dai, L. *Angew. Chem. Int. Ed.* 2011, 50, 3515.
(21) Liu, B.; Zhang, W.; Feng, H.; Yang, X. *Chem. Commun.* 2011, DOI: 10.1039/C1CC13717D.
(22) Hu, Y.; Zhang, Q.; Goebl, J.; Zhang, T.; Yin, Y. *Phys. Chem. Chem. Phys.* 2010, 11836.
(23) Yin, Y.; Alivisatos, A. P. *Nature* 2005, 437, 664.
(24) Huang, X.; Neretina, S.; El-Sayed, M. A. *Adv. Mater.* 2009, 21, 4880.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims.

What is claimed is:

1. A method of preparing a metal nanorod, comprising:
   seeding a metal nanoparticle within the lumen of a close-ended nanotube; and
   growing a metal nanorod from the seeded metal nanoparticle to form a metal nanorod-nanotube composite,
   wherein the close-ended nanotube is closed at both ends,
   wherein the nanotube is a silica nanotube.

2. The method of claim 1, wherein the metal nanoparticle comprises Au, Ag, Pt, Pd, Ir, Rh, or Ru, or a combination thereof.

3. The method of claim 1, wherein the metal nanorod comprises Au, Ag, Co, Cu, Os, Ni, Pb, Pt, Pd, Ir, Rh, Sn, Mn, Fe, Zn or Ru, or a combination thereof.

4. The method of claim 1, wherein the nanotube comprises an inner surface that is functionalized with a metal binding ligand comprising an amino group, thiol group, phosphate group, sulfate group, sulfonate group, or carboxylate group, or a combination thereof.

5. The method of claim 1, wherein the seeding comprises incubating the nanotube with a precursor of the metal nanoparticle and then reducing the precursor to form the metal nanoparticle within the lumen of the close-ended nanotube.

6. The method of claim 1, wherein the growing comprises incubating a nanotube in a solution comprising
   a metal source for a metal in the metal nanorod, the metal source comprising an ion of the metal,
   a coordinating ligand that forms a stable complex with the metal ion,
   a reducing agent for reducing the metal ion, and
   a capping agent that stabilizes atomic monomers of the metal.

7. The method of claim 6, wherein the coordinating ligand is potassium iodide (KI) when the metal is Au, the coordinating ligand is acetonitrile when the metal is Ag, or the coordinating ligand is $NaNO_2$ when the metal is Pt.

8. The method of claim 6, wherein the capping agent is polyvinylpyrrolidone.

9. The method of claim 1, further comprising removing the nanotube from the metal nanorod-nanotube composite.

10. The method of claim 9, wherein the removing of the nanotube comprises etching of the metal nanorod-nanotube composite in solution or gaseous etchant.

11. The method of claim 1, wherein after the seeding and prior to the growing, the method further comprises etching or purifying, or both etching and purifying, the seeded nanotube.

12. The method of claim 11, wherein the etching comprises incubating the seeded nanotube in NaOH.

13. The method of claim 1, further comprising preparing the silica nanotube by coating a rod-shaped nanocrystal with a silica layer or with an organosilicate layer and a silica layer, then removing the rod-shaped nanocrystal to form the silica nanotube.

14. The method of claim 13, wherein the coating comprises sol-gel formation of the silica layer and/or the organosilicate layer.

15. The method of claim 14, wherein the sol-gel formation comprises hydrolyzing and condensing a silicon alkoxide onto the nanocrystal to form the silica layer, or hydrolyzing and condensing an amino-containing organosilane onto the nanocrystal to form the organosilicate layer, followed by hydrolyzing and condensing a silicon alkoxide onto the organosilicate layer to form the silica layer.

16. The method of claim 15, wherein the organosilane is 2-aminopropyltriethoxysilane and the silicon alkoxide is tetraethyl orthosilicate.

* * * * *